O. SMITH.
CHART FOR NAPRAPATHIC TREATMENTS.
APPLICATION FILED JUNE 4, 1917.

1,290,388.

Patented Jan. 7, 1919.

UNITED STATES PATENT OFFICE.

OAKLEY SMITH, OF CHICAGO, ILLINOIS.

CHART FOR NAPRAPATHIC TREATMENTS.

1,290,388. Specification of Letters Patent. Patented Jan. 7, 1919.

Application filed June 4, 1917. Serial No. 172,709.

*To all whom it may concern:*

Be it known that I, Dr. OAKLEY SMITH, a citizen of the United States, and a resident of the city of Chicago, county of Cook, and State of Illinois, have invented certain new and useful Improvements in Charts for Naprapathic Treatments, of which the following is a specification.

My invention relates to improvements in charts for indicating the diagnoses and treatments performed by persons engaged in the naprapathic profession.

It is extremely desirable in diagnosing and treating patients under the naprapathic principle, to provide a simple chart whereon may be readily recorded the diagnosis of the physician and at the same time to indicate the treatments that are being performed and the divers periods during which the said treatment was given the particular patient. The diagnosis, treatment and the time of making the diagnosis and starting treatment are readily recorded through the instrumentality of a schematic diagram of the spinal column, and the particular object of my present invention is to extend the usefulness of such a chart by providing a systematized supplement thereto, which will concisely show the period or periods when treatment was continued, as shown by the main spinal diagram or chart, and also the periods when such treatments may have been discontinued.

I prefer to accomplish the divers objects of my invention by substantially the means and in the manner hereinafter fully described and as more particularly pointed out in the claims, reference being had to the accompanying drawings wherein I have illustrated a preferred or desirable form of my invention.

The drawing illustrates a schematic view of my naprapathic chart and accompanying chart table or synopsis of treatments.

I have found it desirable to consider or list the vertebræ schematically in groups of preferably five, and have illustrated each vertebra in rectangular blocks or chart-bars, 1, having branches, 2, that are each spaced up or divided substantially as shown, for the purpose of making notations thereon. The schematic vertebræ are arranged, the one above the other, in their natural order until a group, 3, of preferably five is formed, and above and below this group are illustrated the lower vertebræ of the preceding group, 4, and the upper vertebræ of the succeeding group, 5, and in order to make these respective groups apparent at a glance, I prefer to space the same apart a slight distance, as indicated at 6, 6, on the drawing. The schematic chart thus far described is substantially the same as that described and illustrated in an application for Letters Patent of the United States, filed by me, November 15, 1913, under Serial Number 801,136, for a "chart for the spinal column," and for which Letters Patent Number 1,143,652 were granted to me, under date of June 22, 1915.

Supplementing and forming a part of the spinal chart for diagnosis and therapy, is a chart or table adapted to receive, in a systematic manner and disclose in graphically tabulated form, indicia denoting the periods during which the particular treatment indicated on the chart was administered by the practitioner or physician to the particular group of vertebræ shown on the chart. In this manner not only is the necessity of making a new chart for a particular diagnosis and treatment obviated, but the spinal chart with its supplement will form a graphic history of the entire treatment upon the specific parts involved. This supplemental chart preferably consists of a plurality of rectangular shaped bounded areas, 10, 10, each provided within its boundaries with suitable indicia and spaces to be filled in by the physician, to show at a glance the divers periods of the particular treatment called for on the main chart. In other words, this indicia discloses the date of discontinuance and reinstatement of the particular treatment prescribed for the group of vertebræ accompanying it. This is highly desirable for the reason that a patient may have several groups of vertebræ under treatment and observation at the same time, and it may be deemed advisable or necessary to temporarily discontinue the treatment of one group or more while continuing the remaining groups under treatment. The space below these bounded areas is preferably divided by a heavy line, 11, leaving a space, 12, for any private notes the physician may care to make; and the other space is provided with indicia and spaces to be filled in with a brief history of the case and symptoms relative to the group of vertebræ appearing on its accompanying chart.

While I have herein illustrated and described certain specific means for carrying out my invention, it, of course, will be obvious to others skilled in the art to which the same appertains, that divers modifications or refinements thereof are possible without departing from the spirit of my invention. For example, the preceding and succeeding vertebræ groups, 4 and 5, may be omitted, or the bounded areas, 10, may be disposed in divers other arrangements, as well as the spaces, 12 and 13, for notations, etc. I therefore desire it understood that all such changes and rearrangements similar thereto, are contemplated as included within the scope of my invention as expressed in the appended claims.

What I claim as new is:—

1. In a device of the character described the combination with a naprapathic chart, consisting of a group of schematic vertebræ each provided with spaces for indicating diagnosis and treatment, of a supplementary chart disposed adjacent thereto adapted to receive notations relative to the respective periods of treatment of the vertebræ indicated on said naprapathic chart comprising a group of linearly arranged areas for receiving indicia whereby the position of the last area containing notations will disclose the prognostic treatment without reference to the nature of the notations contained therein.

2. In a device of the character described a naprapathic chart having provided thereon a group of schematic vertebræ, each schematic vertebra divided to provide spaces for indicating the diagnosis and treatment of the respective vertebra, and a supplementary chart adjacent thereto linearly successive areas whereof are provided with indicia against which notations are adapted to be made relative to the time of discontinuance and reinstatement of the vertebral treatments indicated on said schematic vertebral chart, whereby the location of the last area containing notations will indicate the probable necessity for treatment independently of the meaning of the notations which may be made.

3. In a device of the character described a chart comprising a schematic representation of an anatomical structure divided to provide spaces for indicating the diagnosis and treatment of any portion thereof, and a supplementary chart adjacent thereto a portion whereof is provided with a plurality of lines of horizontally arranged divided areas each having indicia against which notations are adapted to be made relative to the time of discontinuance and reinstatement of treatments indicated on said schematic chart, whereby the position of the last successively marked area will indicate the necessity for treatment without reference to the meaning of the markings contained therein.

Signed at Chicago, county of Cook and State of Illinois, this 5th day of April, 1917.

OAKLEY SMITH.

Witnesses:
E. K. LUNDY, Jr.,
BENJ. T. ROODHOUSE.

Copies of this patent may be obtained for five cents each, by addressing the "Commissioner of Patents, Washington, D. C."